April 23, 1957  A. B. BELGARD  2,789,381
METAL TRIM PLASTIC SPECTACLE FRAME
Filed Oct. 21, 1953
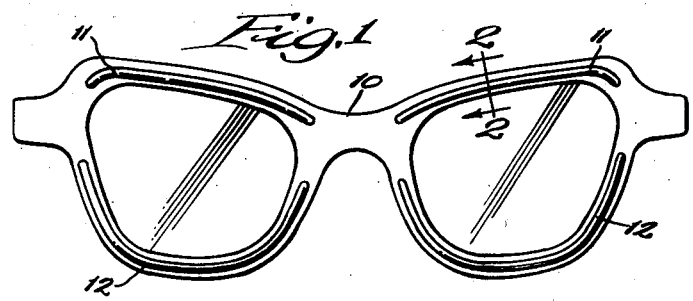
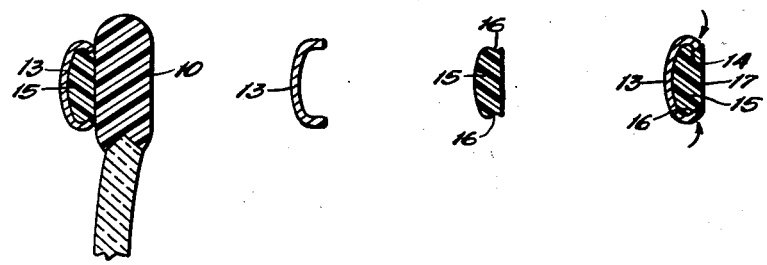
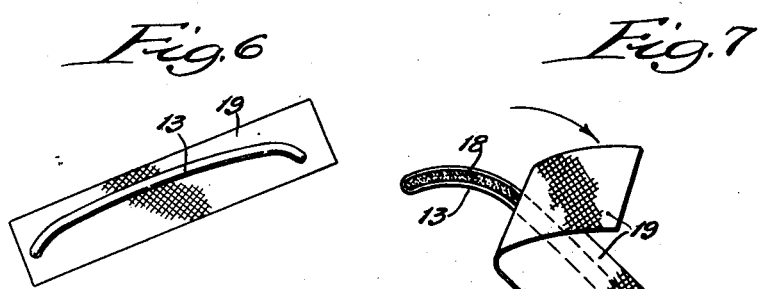
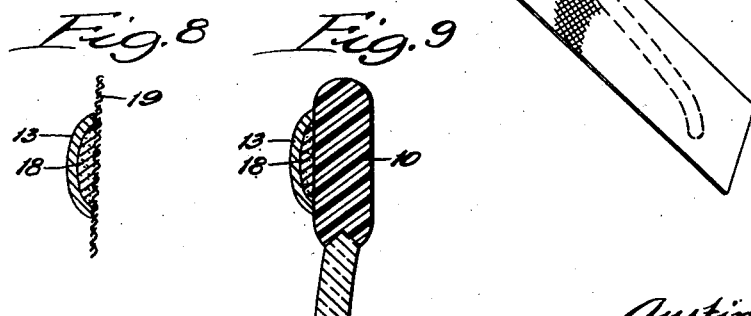
INVENTOR:
Austin B. Belgard,
BY
Dawson, Tilton & Graham,
ATTORNEYS.

United States Patent Office 2,789,381
Patented Apr. 23, 1957

2,789,381

METAL TRIM PLASTIC SPECTACLE FRAME

Austin B. Belgard, Evanston, Ill.

Application October 21, 1953, Serial No. 387,428

2 Claims. (Cl. 41—34)

This invention relates to a metal trim plastic spectacle frame, and to metal trims which may be employed upon plastic frames.

It has been the practice to attach metal strips or bars or ornamental devices to spectacle frames, using pins which pass through the frames to anchor such metal parts in position. The pins weaken the frame structure, often bringing about cracking of the frame and under stress frames break at such weakened points.

An object of the present invention is to provide a plastic spectacle frame which is equipped with metal trims, while at the same time strengthening, rather than weakening, the frame structure. A further object is to provide metal trims which may be readily attached to plastic frames at desired locations, while avoiding any piercing or weakening of the frames. Yet another object is to provide a trim structure which may be applied quickly and firmly to a plastic spectacle frame and while the frame is being fitted upon the face of a patient. Other specific objects and advantages will appear as the specification proceeds.

The invention is shown, in an illustrative embodiment, by the accompanying drawing, in which—

Figure 1 is a front view in elevation of a spectacle frame having metal trim thereon in accordance with my invention; Fig. 2, an enlarged, broken, detail sectional view, the section being taken as indicated at line 2—2 of Fig. 1; Fig. 3, a sectional view of the metal trim or band; Fig. 4, a transverse sectional view of the plastic insert therein; Fig. 5, a transverse sectional view of the combined band and plastic insert; Fig. 6, a top plan view of a metal trim and supporting web therefor; Fig. 7, a perspective view of the structure shown in Fig. 6 with a portion of the web removed; Fig. 8, a transverse sectional view of the structure shown in Fig. 6; and Fig. 9, a broken, enlarged, sectional view showing the trim applied to a spectacle frame, the web having been removed.

In the illustration given, 10 designates a plastic spectacle frame equipped with trim strips 11 and 12. The trim strip 11 is applied to the brow portion of the frame, while the trim strip 12 is applied to the lower portion of the frame.

In the practice of my invention, I employ a metal band or strip 13, having inwardly-turned edges 14, and I employ a plastic insert 15 having an annular groove or recess 16 for receiving the inwardly-turned edges 14 of the metal band 13.

In the structure shown, it will be noted that the plastic insert 15 has a protruding portion 17 which extends outwardly beyond the metal band 13 and presents thus a plastic face which is adapted to receive solvent or adhesive by which the plastic is directly united to the plastic of the frame.

In order to permit the technician to test various trims upon eyeglasses which are being fitted upon the wearer, I prefer to employ a trim described as above in which there is a metal band 13 receiving plastic 15 therein, and on the outside of the plastic I prefer to use a pressure-sensitive adhesive 18. In order to prevent the pressure-sensitive adhesive from contacting various objects, I provide a web material 19 which is loosely anchored to the pressure-sensitive material 18 and protects the same during use prior to the attachment operation.

When it is desired to attach the band to an eyeglass frame, the web 19 is torn away from the pressure-sensitive adhesive 18, as illustrated in Fig. 7, and the trim is then applied to the eyeglass frame. When it is decided that the band is a proper one for attachment to the frame, the union is made complete by the pressure-sensitive adhesive, or, if desired, by other adhesive or solvent to provide a permanent union, as illustrated in Fig. 9.

The decorative strips 11 and 12 may be of reduced size and used on the end piece and nose piece as well as upon the temple and in various shapes and configurations. A temporary bonding gum may be used for trial selection of trim variations by the cumstomer. When permanent adherence is desired, the methods described above may be used.

While, in the foregoing description, I have set forth a specific structure in considerable detail for the purpose of illustrating an embodiment of the invention, it will be understood that such details of structure may be varied widely by those skilled in the art without departing from the spirit of my invention.

I claim:

1. In combination with a plastic spectacle frame, a separate plastic body, a metal sheath enclosing said body on all sides except one and having inturned edges interlocked with the plastic adjacent the unenclosed side, said plastic body having a protruding heel portion on said unenclosed side extending a spaced distance from the edges of said plastic sheath and being free of said metal, said heel portion of said plastic being permanently united to said plastic spectacle frame by solvent adhesive which merges the plastic of said sheathed body with the plastic of said spectacle frame.

2. In combination with a plastic spectacle frame, a metal band having inturned edges and forming a hollow interior, a separate rigid plastic body filling the interior of said band and having a heel portion projecting slightly outwardly from the edges of said band, and solvent-containing adhesive permanently uniting the exposed plastic heel portion of said body to said plastic spectacle frame, whereby the edges of said metal band are brought adjacent the surface of said spectacle plastic frame.

References Cited in the file of this patent

UNITED STATES PATENTS

| | | |
|---|---|---|
| 1,778,726 | Pappert | Oct. 21, 1930 |
| 1,863,633 | Melind | June 21, 1932 |
| 1,996,183 | Walters | Apr. 2, 1935 |
| 2,081,082 | Bates | May 18, 1937 |
| 2,308,462 | Williams | Jan. 12, 1943 |
| 2,442,483 | Blasi | June 1, 1948 |
| 2,552,664 | Burdine | May 15, 1951 |

FOREIGN PATENTS

| | | |
|---|---|---|
| 694,593 | Great Britain | July 22, 1953 |